United States Patent [19]

Nakamura et al.

[11] Patent Number: 4,784,451
[45] Date of Patent: Nov. 15, 1988

[54] WAVEGUIDE OPTICAL SWITCHES

[75] Inventors: Hitoshi Nakamura, Hachioji; Tadashi Fukuzawa, Setagaya; Koji Ishida, Musashino; Hiroyoshi Matumura, Iruma; Kenji Hiruma, Koganei; Hiroaki Inoue, Hachioji, all of Japan

[73] Assignee: Hitachi, Ltd., Tokyo, Japan

[21] Appl. No.: 762,328

[22] Filed: Aug. 5, 1985

[30] Foreign Application Priority Data

Aug. 10, 1984 [JP] Japan .................................. 59-166356
Dec. 24, 1984 [JP] Japan .................................. 59-270886

[51] Int. Cl.[4] ........................................... G02F 1/015
[52] U.S. Cl. ................................. 350/96.14; 357/20; 357/23.12
[58] Field of Search .............. 350/96.11, 96.12, 96.13, 350/96.14, 96.15, 96.34; 357/16, 20, 23.12

[56] References Cited

U.S. PATENT DOCUMENTS 4,521,069  6/1985  Ikeda ................. 350/96.13

FOREIGN PATENT DOCUMENTS

| 0147195 | 7/1985 | European Pat. Off. | 350/96.14 |
| 0147808 | 7/1985 | European Pat. Off. | 350/96.14 |
| 58-60726 | 4/1983 | Japan | 350/96.14 |
| 60-17726 | 1/1985 | Japan | 350/96.14 |
| 60-39615 | 3/1985 | Japan | 350/96.14 |

OTHER PUBLICATIONS

McFee et al., "Beam Deflection and . . . by Free-Carrier Injection in . . . ," *Appl. Phys. Lett.*, vol. 23, No. 10, Nov. 1973, pp. 571-573.

*Primary Examiner*—John D. Lee
*Attorney, Agent, or Firm*—Antonelli, Terry & Wands

[57] ABSTRACT

The present invention provides a waveguide type optical switch which has a high extinction ratio and can be driven efficiently at a low voltage or a low current injection. Where the waveguide type optical switch is used as a reflection type optical switch, the switch section is of current confinement structure, and where it is used as a directional coupler type optical switch, the pn junction is formed in the position where the optical electric field takes the maximum value for the fundamental mode of the light propagating in the waveguide.

8 Claims, 8 Drawing Sheets

WAVEGUIDE OPTICAL SWITCHES

BACKGROUND OF THE INVENTION

1. Field of the Invention

The present invention relates to an improvement of an optical waveguide switch. More particularly, the present invention relates to a reflection type optical switch in which switching occurs when the refractive index is changed which leads to changes is reflectance due to carrier injection at the branch of the optical path, characterized by the branch of the optical path having a current confinement structure so that the extinction ratio is improved. The present invention also relates to an optical directional coupler switch utilizing the optical coupling between two waveguides having improved modulation efficiency low voltage operation.

2. Description of the Prior Art

As the optical communications and optical data processing become more complex, sophisticated, and diversified, there has arisen a demand for optical components which are small, reliable, and have fast responses. For optical switches which are an element of an optical integrated circuit, studies are being made to develop a new optical switch which has a low loss, low drive voltage, fast response, and high extinction ratio. (See H. Kawaguchi, "GaAs RIB-WAVEGUIDE DIRECTIONAL COUPLER SWITCH WITH SCHOTTKY BARRIERS", Electronics Lett., 14 No. 13,387 (1978).) An example of a prior art optical switch is described with reference to FIG. 10, which is a perspective view of a conventional optical directional coupler switch having a pn junction. This switch is made up of an n+-GaAs substrate (carrier concentration: $10^{18}$ cm$^{-3}$) (101), an n-Ga$_{1-x}$Al$_x$As buffer layer (102), n$^-$-GaAs optical waveguide layer (carrier concentration: lower than $10^{15}$ cm$^{-3}$) (103), a p-Ga$_{1-y}$Al$_y$As buffer layer (105), a p+-GaAs cap layer (carrier concentration: $10^{18}$ cm$^3$) (106), and AuGeNi ohmic electrodes (107, 108). The first three layers (101, 102, 103) form a ridge type optical waveguide. FIG. 11(a) schematically shows the distribution of refractive index in the above-mentioned optical switch. The thicknesses of p+-GaAs cap layer (106), p-Ga$_{1-6}$Al$_y$As buffer layer (105), n$^-$-GaAs optical waveguide ridge (104), n$^-$-GaAs optical waveguide layer (103), and n-Ga$_{1-x}$Al$_x$As buffer layer (102) are represented by $t_1$, $t_2$, $t_5$, $t_6$, and $t_4$, respectively. n+-GaAs substrate (101) and p+-GaAs cap layer (106) have a refractive index of $N_0$; n$^-$-GaAs optical waveguide ridge (104) and optical waveguide layer (103) have a refractive index of $N_1$; and p-Ga$_{1-y}$Al$_y$As buffer layer (105) and n-Ga$_{1-x}$Al$_x$As buffer layer (102) have a refractive index of $N_2$. The two buffer layers (105 and 102) have the same molar fraction of Al and therefore $x=y$.

The width and thickness ($t_3$) of the ridge of the optical waveguide, and x and y are properly selected so that the light propagates in the optical waveguide in the fundamental mode (single mode) alone. In other words, the distribution of the intensities of the optical electric field varies according to the refractive index and thickness of the individual layers. For example, if the thickness of the optical waveguide ridge (104) is increased, the light converges into the optical waveguide layer (103).

Figure 10:
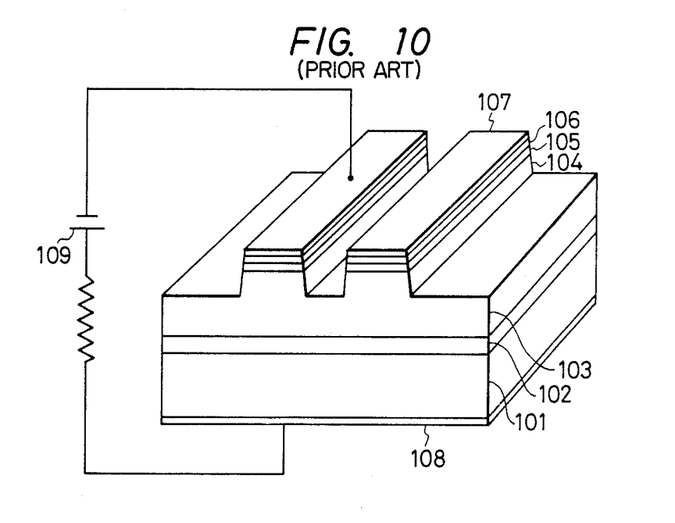
FIG. 10 is a perspective view of the conventional directional coupler type optical modulator.
Figure 11:
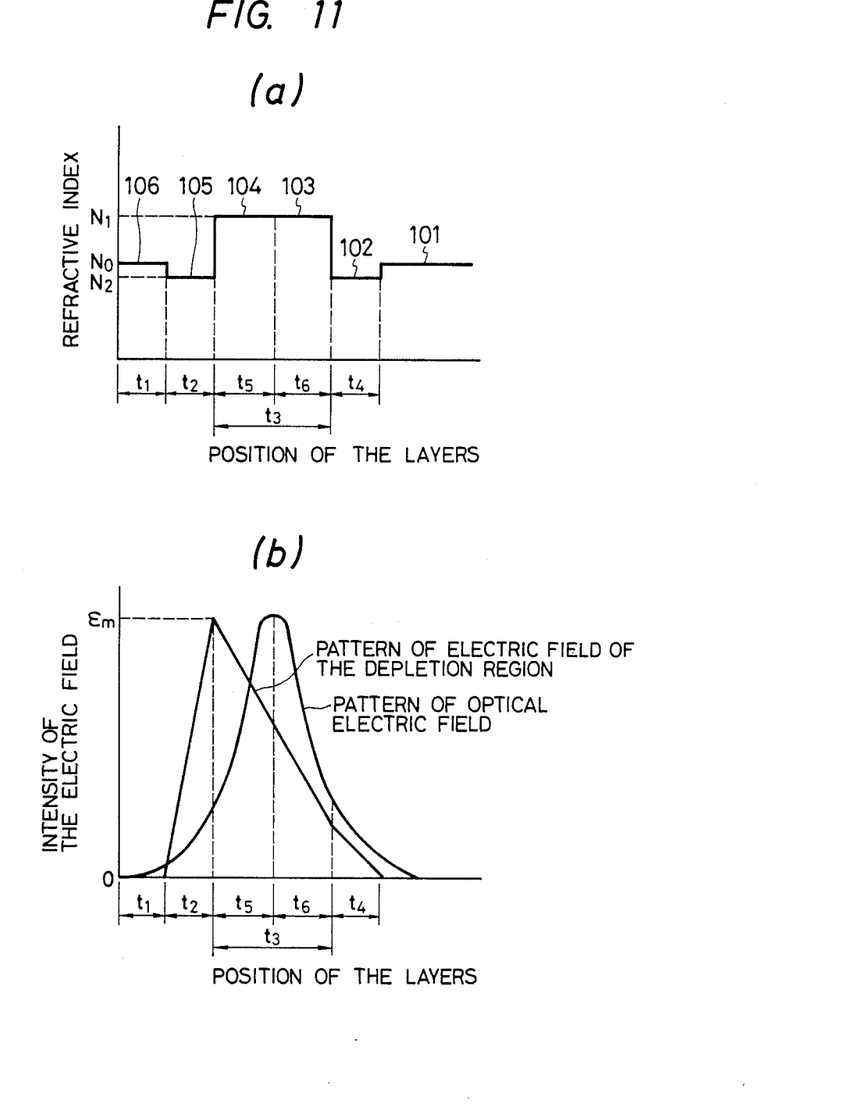
FIG. 11(a) shows the distribution of refractive index in the optical waveguide of FIG. 10.
FIG. 11(b) shows the distribution of the electric field of the depletion region of the pn junction and the distribution of the optical electric field in the optical waveguide of FIG. 10.

FIG. 11(b) schematically shows the distribution of the intensities of the electric field (the distribution of the fundamental mode) of the light that propagates in the optical waveguide of the optical switch shown in FIG. 10. It also schematically shows the distribution of the electric field of the depletion region in the pn junction. The distribution is plotted against the thickness in the direction from p+-GaAs cap layer (106) to n+-GaAs substrate (101). The electric field of the depletion region takes the maximum value ($\epsilon_m$) at the pn junction interface and the optical electric field takes the maximum value somewhere in the n$^-$-GaAs optical waveguide (near n-Ga$_{1-x}$Al$_x$As buffer layer (102) rather than the center).

The switching of a light propagation is accomplished by applying a reverse bias voltage to the pn junction from the power source (109), so that the refractive index in the depletion region is increased and a change takes place in the condition of the coupling between the two parallel optical waveguides. In order for the light switching (or modulation) to be performed effectively in accordance with the applied voltage, it is necessary that the intensity of the electric field of the depletion region and the intensity of the optical electric field overlap with each other at their maximum values. However, this overlap is not seen in FIG. 11(b). In other words, the optical switch of conventional structure as shown in FIG. 10 does not perform effective switching in accordance with the applied voltage.

A reflection type optical switch that utilizes carrier injection, is described in "Waveguided optical switch in InGaAs/InP using free-carrier plasma dispersion", Mikami et al., Electronics Lett., Vol. 20, No. 6, 15th March 1984, p. 228-229. In the optical switch of this type, the injected carriers spread out, causing the refractive index to change over a broad region, and the boundary between the region in which the refractive index is changed and the region in which the refractive index remains unchanged also spreads out. Therefore, it is necessary to inject a large amount of current in order to perform the switching operation. In addition, the optical switch of this type does not have a good extinction ratio because the light leaks into the region in which the refractive index has been changed. If the carrier injection region is lengthened to improve the extinction ratio, the absorption loss increases and the device becomes large, which is a hindrance to practical use.

SUMMARY OF THE INVENTION

It is an object of the present invention to provide an optical switch of the carrier injection type having excellent switching charcteristics (in terms of power consumption, extinction ratio, and injection loss) due to a confinement structure which prevents the carriers injected into the optical path branch from spreading out.

It is another object of the invention to provide an optical modulator (such as an optical switch) which performs modulation efficiently with a low voltage.

These objects of the invention are achieved by a waveguide type optical modulator which utilizes a semiconductor pn junction, in which an optical waveguide is made up of a p-type optical waveguide layer and an n-type optical waveguide layer such that the pn junction is positioned at the place where the electric field of the fundamental mode of the light propagating in the optical waveguide takes the maximum value. This structure permits efficient modulation with a low voltage.

DETAILED DESCRIPTION OF THE INVENTION

The present inventors studied reflection type optical switches which are actuated by carrier injection into a waveguide. As the results of these studies, they have found that the switching characteristics are improved if at least one current confinement section is provided somewhere in the current path from the positive electrode to the negative electrode via the optical branch. It was also found that better effects of confinement are produced by using the following current confinement structure. (1) The part in which the refractive index is changed by carrier injection is sandwiched between two layers which are made of a substance having a greater band gap and a lower refractive index than the substance constituting said part. (2) The current path region adjacent to the region in which the refractive index is changed by carrier injection has parts which are different in conductivity type from the region in which the refractive index is changed. (3) One of the sandwiching layers has parts which are different in conductivity type from the region in which the refractive index is changed.

Figure 1:
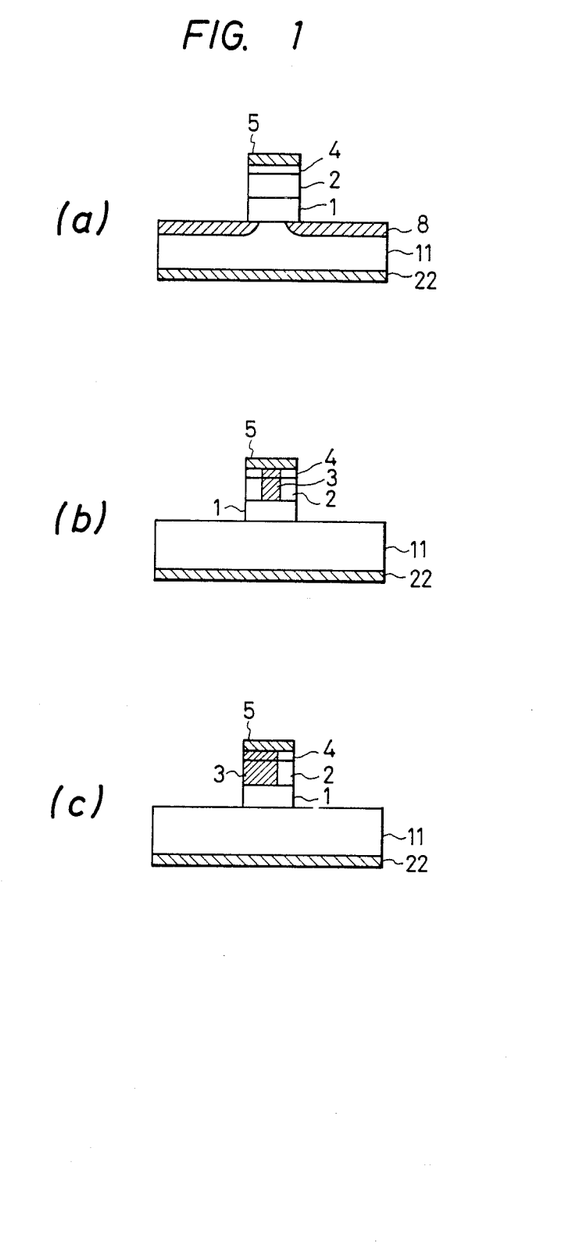
FIGS. 1(a), 1(b) and 1(c) and 2 are schematic views illustrating the present invention.

The present invention is described with reference to FIG. 1. The optical waveguide layer (1) has a region in which the refractive index is changed by carrier injection. The optical waveguide layer (1) is sandwiched by the substrate (11) and the guide layer (2) which are made of a substance having a greater band gap and a lower refractive index than the substance of which the optical waveguide layer (1) is made.

FIG. 1(a) shows an embodiment in which a part (8) of the substrate (11) adjacent to the optical waveguide layer (1) is different in conductivity type from the optical waveguide layer (1). FIGS. 1(b) and 1(c) show another embodiment in which a current confinement region (3) which is a part of the guide layer (2) is different in conductivity type from the optical waveguide layer (1). The above-mentioned embodiments may be modified such that the substrate (11) is covered with a thin layer having a greater band gap and a lower refractive index than the optical waveguide layer (1) and the optical waveguide layer (1) is formed on the thin layer. Further, some features of the three kinds of structures shown in FIGS. 1(a), 1(b), and 1(c) may be combined.

Figure 2:
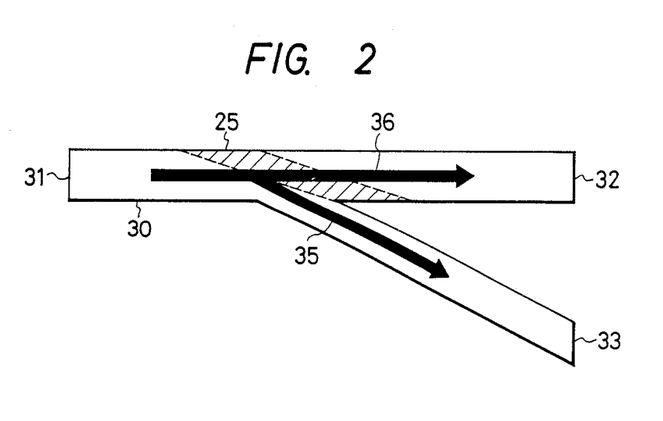

The following is an explanation of the switching operation of a reflection optical switch which is activated by carrier injection. FIG. 2 is an enlarged plan view of the light path of a 1×2 Y-type total reflection optical switch. The incident light enters through an entrance (31) and reaches the part (25) in which a refractive index is changed by carrier injection. When carrier injection has not yet been performed and consequently the refractive index remains unchanged, most of the incident light passes through a path (36) and leaves from an exit (32) and any leaked light leaves from an exit (33). When carriers are injected into the optical path branch, the refractive index in the part (25) decreases and consequently the incident light is reflected by it toward a path (35). Thus most of the incident light leaves from the exit (33). In this way, the light path is switched. The extinction ratio is defined by the ratio of the amount of the light leaving the exit to the amount of leaked light. The present invention greatly improves the extinction ratio.

The polarity of the electrode through which carrier injection is performed may be reversed as a matter of course depending on the material and structure used.

In the embodiments shown in FIGS. 1(a) and 1(b), the optical waveguide layer (1) is adjacent to the current confinement region (3); but a thin layer (several micrometers in thickness) may be interposed between them. In addition, the current confinement region (3) may not necessarily be formed as far as the lower surface of the guide layer (2).

According to the invention, it is possible to make the carrier distribution sharp and it is also possible to define the region where the refractive index is changed. As a result, the penetration of light decreases into the region in which the refractive index is changed and serves as a reflection region for optical signals. This leads to a decrease of absorption loss of optical signals and an improvement of the extinction ratio in switching. In addition, the above-mentioned structure permits an increase of current density and good switching characteristics are achieved with a small injection current.

The invention is now described with reference to the following examples.

EXAMPLE 1

Figure 3:
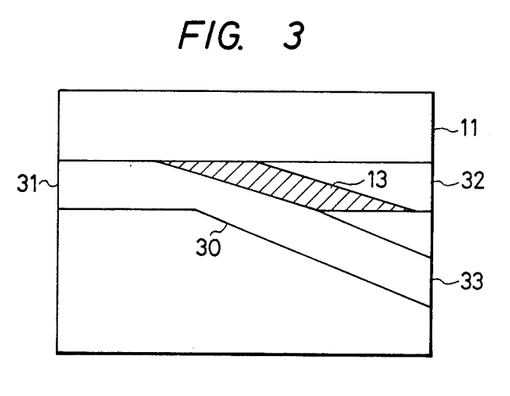
FIG. 3 is a plan view of the optical switch described in Example 1.
Figure 4:
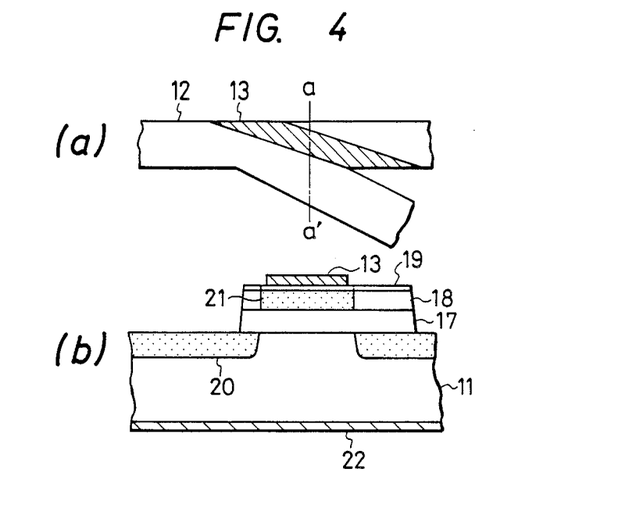
FIGS. 4(a) and 4(b) is a plan view and a sectional view respectively of the optical switch described in Example 1.

FIG. 3 is an enlarged plan view of the optical path branch of the 1×2 Y-type reflection optical switch shown in FIG. 2. FIG. 4(b) is a sectional view taken along the line a—a' in FIG. 4(a).

Figure 5:
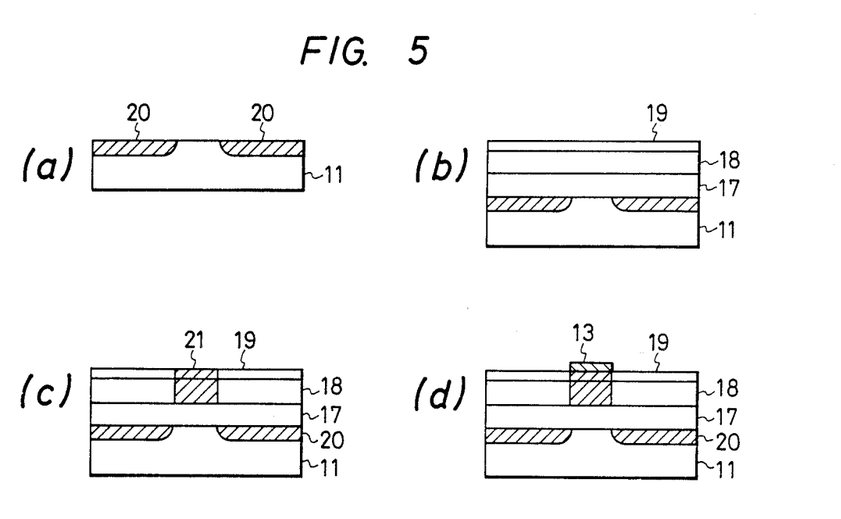
FIGS. 5(a), 5(b), 5(c) and 5(d) are schematic views illustrating the method of manufacturing Example 1.

First, a process of production is described with reference to FIG. 5. A substrate (11) was made of n-type InP having a carrier density of $2 \times 10^{18}$ cm$^{-3}$. Then Zn-diffused region (20) was formed on the surface of the substrate (11). (See FIG. 5(a).) An InGaAsP layer (17), an InP layer (18), and an InGaAsP cap layer (19) were formed consecutively by liquid phase epitaxy, as shown in FIG. 5(b). Zn was then diffused into a portion of the InP layer (18) and the cap layer (19), whereby the current path (21) was formed. The InGaAsP wave guide layer (17), the InP guide layer (18), and the cap layer (19) were then etched with a sulfuric acid-based etchant and a phosphoric acid-based etchant so that the optical path branch shown in FIG. 3 was formed. An electrode (13) was formed by deposition of Au-Zn. Finally, an electrode (22) was formed on the back of the substrate (11) by deposition of Au-Ge-Ni. In this way the optical switch was completed.

The switching characteristics of this optical switch were evaluated by entering multimode light (wavelength: 1.5 μm) into an entrance (31). When no voltage was applied, the extinction ratio $P_1/P_2$ was 100/1, wherein $P_1$ is the output from the exit (32) and $P_2$ is an output from an exit (33). When 3 V (20 mA) was applied, the extinction ratio $P_1/P_2$ changed to 1/28. This result is satisfactory for practical use.

The above-mentioned optical switch measured 1 mm×0.5 mm; the branching angle at the Y waveguide was 10°; and the waveguide was 15 μm wide.

In this example, the current confinement structure was made by Zn diffusion on the n-InP substrate (11). A similar optical switch was obtained when a high-resistance layer was formed by oxygen ion or proton implantation, followed by annealing.

EXAMPLE 2

Figure 6:
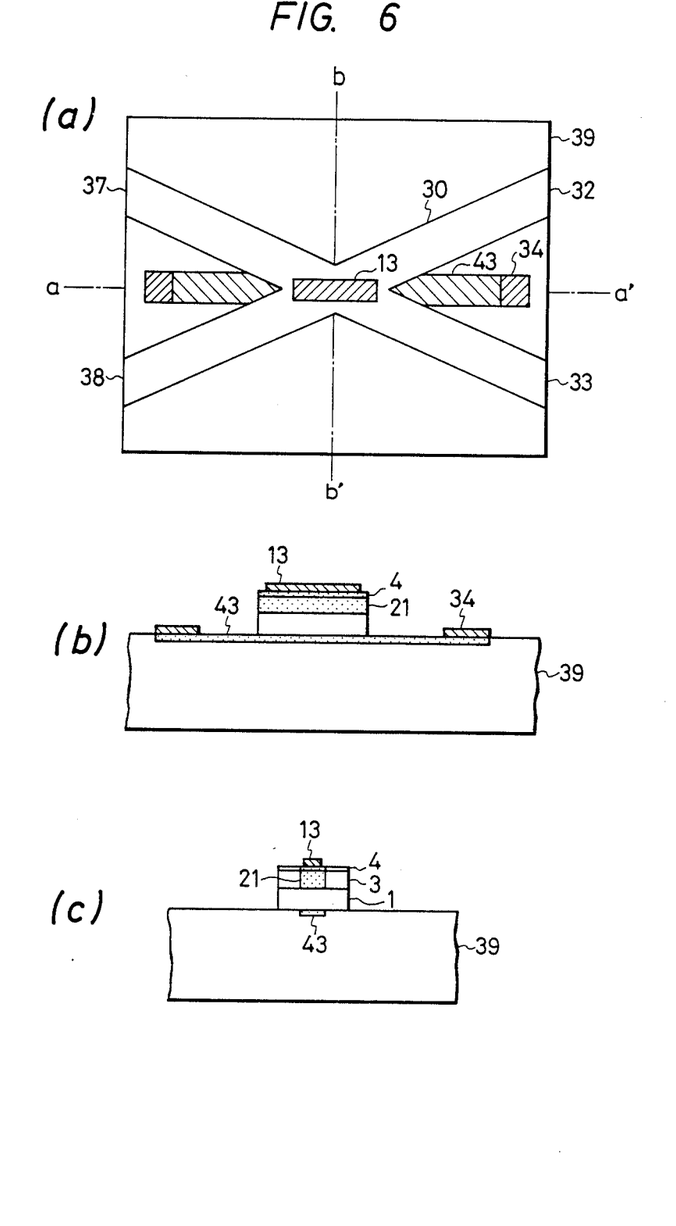
FIGS. 6(a), 6(b) and 6(c) are a plan view and sectional views respectively of the optical switch described in Example 2.

The 2×2 X-type reflection optical switch as shown in FIG. 6(a), 6(b) and 6(c) was also prepared. FIG. 6(a) is a plan view; FIG. 6(b) is a sectional view taken along the line a—a' in FIG. 6(a); and FIG. 6(c) is a sectional view taken along the line b—b' in FIG. 6(a). A substrate (39) was made of semi-insulating InP (band gap: 1.35 eV, refractive index: 3.2 for a wavelength of 1.5 μm). On the substrate (39) were formed an optical waveguide (32), a positive electrode (13), and a negative electrode (34). The optical waveguide (32) was made up of an optical guiding layer (1), a clad layer (3), and a cap layer (4).

The optical guiding layer (1), 1 μm thick, was made of n-type InGaAsP (carrier density: $5 \times 10^{16}$ cm$^{-3}$, band gap: 0.9 eV, refractive index: 3.4 for a wavelength of 1.5 μm). The clad layer (3), 1 μm thick, was made of n-type InP (carrier density: $5 \times 10^{17}$ cm$^{-3}$, band gap: 1.35 eV, and refractive index: 3.2 for a wavelength of 1.5 μm). The cap layer (4), 0.1 μm thick, was made of n-type InGaAsp (carrier density: $5 \times 10^{17}$ cm$^{-3}$, band gap: 1.1 eV, and refractive index: 3.3 for a wavelength of 1.5 μm).

The process of production is described below. At first, an n-type region (43) was formed by Si implantation on the substrate (39). The optical guiding layer (1), the clad layer (3), and the cap layer (4) were then formed by liquid phase epitaxy. A current path region (21), which is a Zn-diffused p-type region, was then formed. An optical waveguide (30) was then formed by dry etching. Finally, the positive electrode (13) and the negative electrode (34) were formed by deposition. In this way the opticl switch was completed.

This optical switch measured 1 mm×0.5 mm the separation angle of the waveguide was 8°; and the waveguide was 10 μm wide.

The optical switch in this example works in the same way as that in Example 1, its structure having the electrodes formed on only one side facilitates integration.

The switching characteristics of this optical switch were evaluated by entering multimode light (wavelength: 1.5 μm) into entrances (37 and 38). When no voltage applied, the extinction ratio $P_1/P_2$ was 25/1, wherein $P_1$ is the output from the exit (32) and $P_2$ is an output from an exit (33). When 2.5 V (15 mA) was applied, the extinction ratio $P_1/P_2$ changed to 1/28.

Therefore, good switching characterisitcs are attributable to the confinement structure which sharply defines the region in which the refractive index is changed by carrier injection.

The optical switch produced in this example is of practical value because of its small size and great extinction ratio. It will make it easy to build a new optical transmission and communications system and will help the expansion of the market.

The 2×2 X-type reflection optical switch in this example works also as a directional coupler optical switch, or as a mode conversion type optical switch. When the optical guide is in single mode operation, the even mode and the odd mode propagate in the branch where the optical guides intersect each other. In this case, only the phase of the even mode light changes due to the change in refractive index, because the electrode is installed at the center of the branch. As the result, the overlap of the even mode light and the odd mode light at the exit (32) is different from that at the exit (33). In this way switching is accomplished.

EXAMPLE 3

Figure 7:
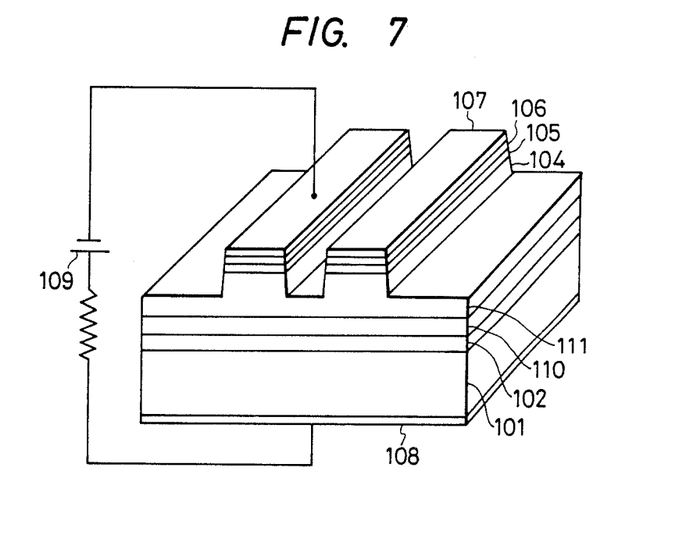
FIG. 7 is a perspective view of the waveguide type optical modulator prepared in Example 3.

FIG. 7 is a perspective view of a waveguide type optical modulator prepared in this example. It is a directional coupler type optical modulator having a ridge type waveguide.

Figure 8:
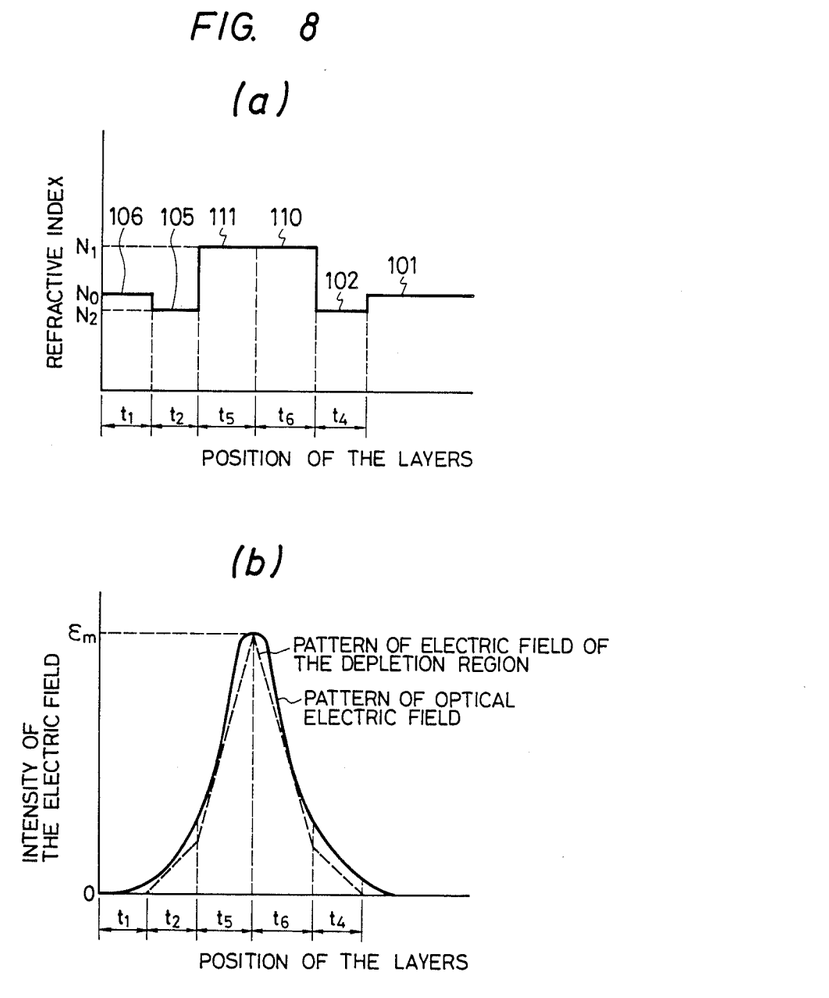
FIG. 8(a) shows the distribution of refractive index in the optical waveguide of the optical modulator prepared in Example 3.
FIG. 8(b) shows the distribution of the electric field of the depletion region of the pn junction and the distribution of the optical electric field.

FIG. 8(a) shows the relation between the distribution of refractive index and the layer thickness near the optical waveguide and the buffer layer.

FIG. 8(b) shows the distribution of the electric field of the depletion region of the pn junction and the distribution of the optical electric field.

The directional coupler type optical modulator as shown in FIG. 7 was prepared by growing a buffer layer (102), a optical waveguide layer (110), an optical waveguide layer (111), a buffer layer (105), and a cap layer (106) successively on a substrate (101) by metal organic vapor phase epitaxy (MOCVD). The details of each layer are given below. Buffer layer (102): n−G$_{1-x}$Al$_x$As (n: $10^{16}$ cm$^{-3}$, x =about 0.03) Optical waveguide layer (110): n−-GaAs (carrier density: $10^{15}$ cm$^{-3}$) Optical waveguide layer (111): p−-GaAs (carrier density: $10^{15}$ cm$^{-3}$) Buffer layer (105): p−-Ga$_{1-y}$Al$_y$As (p: $10^{15}$ cm$^{-3}$, y=about 0.03) Cap layer (106): p$^+$-GaAs (p: $10^{18}$ cm$^{-3}$) Substrate (101): n$^+$-GaAs (carrier density: $10^{18}$ cm$^{-3}$)

Ohmic electrodes (107 and 108) of Au-Ge-Ni were formed on the cap layer (106) and the back side of the substrate (101), respectively, by a vacuum deposition method. Dry etching was performed to form two ridges, each measuring 2 μm in height and 7 μm in width, 3 μm apart. Thus there was obtained a directional coupler type optical modulator having a ridge type optical waveguide (104).

The thickness of each layer shown in FIG. 8(a) is as follows: $t_4=1$ μm, $t_6=2$ μm, $t_5=3$ μm, $t_2=1$ μm, and $t_1=0.5$ μm, in the order starting from a layer adjacent to the substrate (101).

The distribution of the electric field of the depletion region at the pn junction is shown in FIG. 8(b). It is noted that there is the maximum value $\epsilon_m$ at the pn junction. When the light having a wavelength of 1.3 μm propagates, the optical electric field of a fundamental mode takes nearly the maximum value at the pn junction as shown in FIG. 8(b). It is noted that the two curves overlap almost completely with each other.

The optical switch, 8 mm long, prepared in this example was examined for switching characteristics as follows: When semiconductor laser beam (wavelength: 1.3 μm) was entered into one (e.g., left side) of the two parallel ridge type optical waveguides shown in FIG. 7, the light emerged from the other one (e.g., right side) of the optical waveguides. This indicates that the two optical waveguides are equal to the complete coupling length.

Then, the electrode (107) on one (left side) of the two optical waveguides was connected to a power source (109) as shown in FIG. 7, and a reverse bias voltage was applied gradually. As the reverse bias voltage increases, the intensity of the light emerging from the right optical waveguide became weak gradually and, conversely, the intensity of the light emerging from the left optical waveguide became strong gradually. The switching of the light was performed almost completely when the reverse bias voltage was $-10$ V. The extinction ratio at this time was 20 dB.

The same experiment as above was carried out for the optical switch of conventional structure as shown in FIG. 10. In this optical switch, an optical waveguide layer (103) was made of $n^-$-GaAs and buffer layer and cap layer were made in the same way as in this example. The optical switch was 8 mm long and the complete coupling length was obtained when the reverse bias voltage was zero. Nevertheless, a reverse bias voltage of $-20$ V was required for optical switching. The reason for this high switching voltage as compared with that in the case of the present example is that the electric field of the depletion region and the distribution of the optical electric field do not completely overlap each other.

The $n^-$-GaAs layer (110) and the $p^-$-GaAs layer (111) both forming the optical waveguide have a high resistance, with the free electron density lower than $10^{14}$ cm$^{-3}$. Therefore, the propagation loss of light having a wavelength of 1.3 μm was as low as 0.1 dB/cm.

The optical electric field which is present in the electric field of the depletion region is less affected by the light absorption loss due to the metal electrode than the optical electric field which is formed by Schottky contact in the electric field of the depletion region. This is one of the features of the pn junction type optical modulator.

EXAMPLE 4

Figure 9:
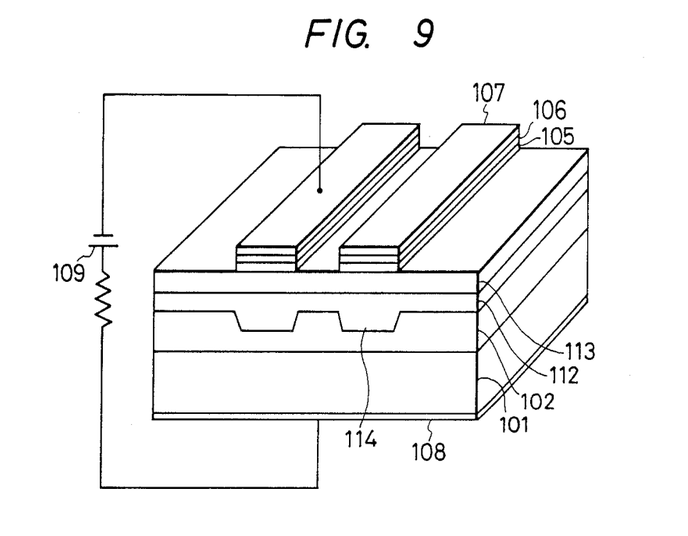
FIG. 9 is a perspective view of the optical modulator prepared in Example 4.

FIG. 9 is a perspective view of a directional coupler type optical modulator having burried type ridges. The production process is as follows: A $Ga_{1-x}Al_xAs$ buffer layer (x=about 0.05) (102) was formed by a MOCVD method until it grew 2 μm thick. Two parallel grooves (114) 3 μm apart, each measuring 7 μm wide and 1 μm deep, were then fabricated by dry etcing. An $n^-$-GaAs optical waveguide layer, 2 μm thick, (112); a $p^-$-GaAs optical waveguide layer, 1 μm thick, (113); a p-$Ga_{1-y}Al_yAs$ buffer layer, 0.5 μm thick, (y=about 0.05) (105); and a $p^+$-GaAs cap layer, 0.5 μm thick, (106) were formed successively by liquid phase epitaxy. Then electrodes (107 and 108) were formed on the $p^+$-GaAs cap layer (106) and the back side of a $n^+$-GaAs substrate (101) by vacuum deposition of Au-Ge-Ni. Dry etching was performed to form the projected three layers of the electrode (107), the cap layer (106), and the buffer layer (105), as shown in FIG. 9. Thus there was obtained a directional coupler optical modulator.

When a semiconductor laser beam (wavelength: 1.3 μm) was directed into one of the two optical waveguides of the directional coupler optical modulator, the intensity of the optical electric field took the maximum value at the boundary of the pn junction. In addition, it completely overlapped the distribution of the electric field of the depletion region. It was found that the complete coupling length was obtained when the optical waveguide was 6 mm long. When a reverse bias voltage was applied gradually to the electrode (107) from a power source (109), the switching of light was accomplished at $-8$ V, and the extinction ratio was 20 dB.

For comparison, a similar device was prepared in which the optical waveguide layer has a pn junction but a 3 μm thick optical waveguide is formed only with the $n^-$-GaAs optical waveguide layer (112). The p-$Ga_{1-y}Al_yAs$ buffer layer (105) and $p^+$-GaAs cap layer (106) were formed on the optical waveguide in the same thickness as in Example 2. For this device, a reverse bias voltage of $-17$ V was required for the switching of light.

In the above-mentioned examples, the devices were made of GaAsGaAlAs semiconductor; but the same effect was produced in waveguide type optical modulators made of a InP-InGaAsP semiconductor.

The waveguide type optical modulator of this invention utilizes the semiconductor pn junction. It permits optical modulation with a low drive voltage because the pn junction is formed at the position where the intensity of the electric field of the fundamental mode of the light propagating in the optical waveguide is at a maximum. Thus it is immune from degradation by breakdown and is more reliable and has a longer life than the conventional waveguide type optical modulator. The device of the present invention is uniform in quality and may be produced in high yields. On account of the low drive voltage, the device of this invention contributes to the reduction of production and maintenance cost of a system.

What is claimed is:

1. A reflection type optical switch comprising:
   a semiconductor substrate;
   a plurality of semiconductor layers formed on said semiconductor substrate; including an optical waveguide layer having a plurality of optical waveguide paths to propagate light; a switching region in at least one of said optical waveguide paths wherein switching is accomplished when a refractive index at said switching region is changed by carrier injection; and a path region for injecting carriers by said carrier injection;
   a current confinement structure formed in at least one of said path region and said semiconductor substrate and formed to be separate from said optical waveguide layer, said current confinement structure allowing said carriers to be injected only into said switching region; and
   a pair of electrodes for injecting the carriers into the switching region.

2. An optical switch according to claim 1, wherein said semiconductor is a compound semiconductor.

3. An optical switch according to claim 1, wherein said carrier injection is performed by current injection.

4. An optical switch according to claim 1, wherein said current confinement structure includes a conductivity type in an area adjacent said switching region different from a conductivity type in areas not adjacent said switching region.

5. An optical switch according to claim 1, wherein said plurality of semiconductor layers further includes:
 a clad layer formed on said opticl waveguide layer;
 a cap layer formed on said clad layer; and
 wherein said pair of electrodes are formed on said cap layer and on said semiconductor substrate respectively.

6. An optical switch according to claim 5, wherein said clad layer and a portion of said semiconductor substrate adjacent said optical waveguide layer have a greater band gap and a lower refractive index than said optical waveguide layer.

7. An optical switch according to claim 1, wherein said current confinement structure is formed in both said path region and said semiconductor substrate.

8. An optical switch according to claim 1, wherein said current confinement structure has high-resistance.

* * * * *